(12) United States Patent
Böhm et al.

(10) Patent No.: US 12,169,919 B2
(45) Date of Patent: Dec. 17, 2024

(54) IMAGING METHOD WITH IMPROVED IMAGE QUALITY

(71) Applicant: Siemens Healthcare GmbH, Erlangen (DE)

(72) Inventors: Stefan Böhm, Oberasbach (DE); Boris Stowasser, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 412 days.

(21) Appl. No.: 17/572,047

(22) Filed: Jan. 10, 2022

(65) Prior Publication Data
US 2022/0230285 A1    Jul. 21, 2022

(30) Foreign Application Priority Data
Jan. 15, 2021 (DE) ............... 10 2021 200 364.8

(51) Int. Cl.
| | | |
|---|---|---|
| G06T 5/94 | (2024.01) | |
| G06T 5/20 | (2006.01) | |
| G06T 5/50 | (2006.01) | |
| G06T 7/00 | (2017.01) | |

(52) U.S. Cl.
CPC ............... *G06T 5/94* (2024.01); *G06T 5/20* (2013.01); *G06T 5/50* (2013.01); *G06T 7/0012* (2013.01); *G06T 2207/10116* (2013.01); *G06T 2207/20028* (2013.01); *G06T 2207/20224* (2013.01); *G06T 2207/30101* (2013.01)

(58) Field of Classification Search
CPC .... G06T 5/94; G06T 5/20; G06T 5/50; G06T 7/0012; G06T 2207/10116; G06T 2207/20028; G06T 2207/20224; G06T 2207/30101; G06T 5/75; G06T 2207/10121; G06T 2207/30021
See application file for complete search history.

(56) References Cited

U.S. PATENT DOCUMENTS

| | | | |
|---|---|---|---|
| 2010/0061603 A1 | 3/2010 | Mielekamp et al. | |
| 2011/0038458 A1 | 2/2011 | Spahn | |
| 2013/0223719 A1* | 8/2013 | Ohishi | A61B 6/12 382/132 |
| 2020/0013152 A1 | 1/2020 | Böhm et al. | |
| 2020/0202501 A1 | 6/2020 | Schreiber | |

FOREIGN PATENT DOCUMENTS

| | | |
|---|---|---|
| DE | 102009037243 A1 | 2/2011 |
| DE | 102018222595 A1 | 6/2020 |

OTHER PUBLICATIONS

Buemi, Antonio, Gaetano Santoro, Arcangelo Bruna, and Mirko Guarnera. "Adaptive sharpening with overshoot control." In International Conference on Image Analysis and Processing, pp. 863-872. Springer, Berlin, Heidelberg, 2009.

* cited by examiner

*Primary Examiner* — Jianxun Yang
(74) *Attorney, Agent, or Firm* — Lempia Summerfield Katz LLC

(57) ABSTRACT

A vessel image, which maps a vessel structure, and a device image, which maps a device, are created. A processor, depending on the device image and the vessel image, creates an overlaying image. At least one filter algorithm is applied to the device image, creating a filtered device image. The overlaying image is created by overlaying of the vessel image with the filtered device image.

14 Claims, 5 Drawing Sheets

E    E'    KS

KS    KS'

IMAGING METHOD WITH IMPROVED IMAGE QUALITY

RELATED APPLICATION

This application claims the benefit of German Application DE 10 2021 200 364.8, filed on Jan. 15, 2021, which is hereby incorporated by reference in its entirety.

FIELD

The present embodiments relate to an imaging method, wherein a vessel image, which maps a vessel structure of an object to be imaged, and a device image, which maps a device arranged in the object, are created by an imaging apparatus. Depending on the device image and the vessel image, an overlaying image is created by a processing unit. The embodiments further relate to a corresponding imaging apparatus and also to a computer program product (e.g., non-transitory computer readable medium).

BACKGROUND

In modern imaging methods, in particular x-ray-based imaging methods for support of interventions, for example fluorescence-assisted x-ray-based methods, what is known as road mapping is employed, in order to be able to follow especially well a tool or other device inserted or introduced into the object during the intervention, within the object, for example a vessel structure of the object. To this end, on the one hand a vessel image is recorded and on the other hand a device image. The vessel image in this case corresponds to a static image, which is created before the insertion of the device and maps the vessel structure of the object to be imaged. The device image by contrast shows the device arranged in the object. A so-called double subtraction method can be employed for example, in which both the vessel image and also the device image are each created by subtraction of an image from a corresponding reference image, also referred to as a mask.

The device image is overlaid with the vessel image in order to create an overlaying image or a so-called roadmap image, in which the static vessel structure and the overlaid tool can now be shown at the same time in the object or in the vessel structure. As the position of the device changes the device image can be updated accordingly, so that the movement of the device in the object, in particular in relation to the vessel structure, can be followed by a person carrying out the treatment, by the overlaying image being shown on a monitor or display for example.

In order to make it possible to trace the device with regard to the vessel structure as exactly as possible and thus to make it possible to guide the device within the object as exactly as possible, it is worth making the effort to achieve an image quality of the overlaying image that is as high as possible. In particular, in the context of x-ray-based imaging methods, it might possibly be difficult to recognize the device clearly in the overlaying image and to clearly distinguish it from other elements of the overlaying image, for example representations of tissue or bone structures or also the vessel structure. Moreover, residues of contrast media, which were used for example to create the vessel image but are undesirable in the creation of the device image, can lead to artifacts or to disruptive influences in the overlaying image.

SUMMARY

Against this background, an object of the present embodiments is to specify an improved concept for imaging, in particular for roadmap imaging, for example for x-ray-based roadmap imaging, through which the image quality of the resulting overlaying image can be improved.

The improved concept is based on the idea, before the overlaying of the device image with the vessel image, of providing at least one filter algorithm in the process path for creating the device image, in order to create a filtered device image, which is then overlaid with the vessel image instead of the original device image in order to create the overlaying image.

The filter algorithm is suited in a particular way to the contents and the purposes of the device image. It can be particularly well suited to emphasizing the imaging of the device itself more recognizably. It can also be particularly well suited to freeing image contents other than the device itself from disruptive influences. The filter algorithm can in particular be especially well suited to improving the device image, at the same time but less well to improving the vessel image. For example, the filter algorithm can emphasize image contents with comparatively small intensity values more strongly, which applies in particular to the representation of the device itself; the representation of the device is thereby in particular therefore more strongly emphasized in the device image, while in the vessel image, structures possibly irrelevant for the purpose of imaging or even image errors could thereby be more strongly emphasized if filtered, which is avoided by filtering the device image and not the vessel image.

In accordance with the improved concept, an imaging method is specified, wherein an imaging apparatus, a vessel image is created that maps a vessel structure of an object to be imaged. Moreover, the imaging apparatus creates a device image that maps a device arranged in the object, in particular in the vessel structure. A processing unit (processor), in particular the imaging apparatus, depending on the device image and the vessel image, creates an overlaying image. Through application of at least one filter algorithm to the device image, a filtered device image is created by the processing unit and the overlaying image is created by the processing unit by overlaying the vessel image with the filtered device image.

The imaging apparatus can for example be an imaging modality and include the processing unit, wherein the processing unit in various embodiments can also be seen as part of the imaging modality. In particular, the imaging modality can be embodied as an x-ray imaging device, thus accordingly containing an x-ray source and an x-ray sensitive sensor.

The imaging method is embodied in particular as a roadmap method, wherein for example a double subtraction method is employed for creating the device image and the vessel image. The overlaying image, which can also be referred to as the roadmap image, can be seen as the result or part result of the imaging method.

The vessel image is in particular created before the device is arranged in the object, thus in particular does not image the device. The device image can also be created repeatedly or updated during the imaging method, as can the filtered device image and accordingly the overlaying image. The vessel image in this case can remain unchanged, so that the position of the device in the overlaying image can change, in particular with regard to the vessel structure. In this way, the movement of the device in the object, in particular with regard to the vessel structure, can be monitored.

The application of the at least one filter algorithm to the device image enables the image quality of the device image and thus of the overlaying image to be improved. In particular, depending on the embodiment of the at least one filter algorithm, the recognizability of the device in the filtered device image compared to the unfiltered device image can be improved. To do this, for example, a local contrast enhancement algorithm can be employed. The fact that this is only integrated into the device path and not into the vessel path, i.e., only the device image is filtered but not the vessel image, enables the unnecessary enhancement of artifacts or disruptive influences in the vessel image to be prevented and in this way leading to a correspondingly degraded image quality of the overlaying image. In particular, it is especially advantageous with roadmap methods to improve the recognizability of the device where possible, wherein the recognizability of the vessel structure is less critical, not least because of the possibility that the position of the device changes during consecutive frames, while the vessel image remains static.

Depending on the embodiment of the at least one filter algorithm, as an alternative or in addition, other disruptive influences in the device image, for example caused by contrast medium residues in the vessel structure, which are advantageous for the creation of the vessel image but are undesirable for the creation of the device image, can be reduced. Also, the image quality of the filtered device image and accordingly of the overlaying image can be improved thereby. To this end, for example, a bilateral filter algorithm can be employed. Here too it is especially advantageous to apply the corresponding filter only to the device image, but not to the vessel image for the creation of which the contrast medium has just been employed.

In accordance with at least one embodiment of the imaging method according to the improved concept, a first reference image, which can also be referred to as the first mask image, is created by the imaging apparatus without using a contrast medium and a contrast medium image is created using a contrast medium, which represents the vessel structure. In this case, the first reference image is in particular created before the contrast medium image and in particular before the contrast medium is introduced into the object, in particular the vessel structure. The vessel image is created by the processing unit as a first subtraction image of the contrast medium image and the first reference image.

The creation of the first subtraction image, in different embodiments, can also include a registration of the contrast medium image with the first reference image.

The first subtraction image can thus be created for example by the first reference image and the contrast medium image being subtracted from one another or registered with one another and then subtracted from one another.

The first reference image in this case in particular represents an environment, in particular tissue in the environment, of the vessel structure as well as the vessel structure itself. The contrast medium image likewise represents the vessel structure as well as the environment, wherein through the application of the contrast medium however an image contrast between regions that correspond to the vessel structure and of other regions compared to the reference image is greatly enhanced. Thus, through the creation of the first subtraction image, those portions of the contrast medium image that are not emphasized by the application of the contrast medium are removed by the subtraction of the first reference image or at any rate are weakened. The resulting first subtraction image, i.e., the resulting vessel image, therefore represents the vessel structure especially clearly, whereas the other structures and/or tissue portions in the environment are not shown or only shown indistinctly.

Through this, the recognizability of the vessel structure in the vessel image and ultimately in the overlaying image is improved.

The contrast medium image and the first reference image can in particular correspond to respective x-ray recordings.

In particular, the contrast medium image and the first reference image are recorded with identical imaging parameters of the imaging modality and in particular of the x-ray source and of the sensor. This makes possible a reduction or avoidance of artifacts in the first subtraction image.

In accordance with at least one embodiment a second reference image and an examination image are created by the imaging apparatus after the creation of the contrast medium image. The examination image in this case represents the device arranged in the object. The device image is created by the processing unit as the second subtraction image of the examination image and of the second reference image.

As explained with regard to the creation of the first subtraction image, the creation of the second subtraction image can also include a corresponding registration of the examination image with the second reference image.

During creation of the second reference image, the device is in particular not arranged in the object, thus for example has not yet been moved into the corresponding image-recording region. In other words, the device can have already been introduced into the object but is not located in the image-recording region for the second reference image, so that the device in any event is not mapped by the second reference image. During the recording of the examination image on the other hand, the device is arranged in the object, in particular in the corresponding image-recording region for the examination image, so that this can show the device arranged in the object.

Both the second reference image and also the examination image are created in this case where possible without using a contrast medium. Since the contrast medium image has been created before the creation of the second reference image, even if not immediately before, contrast medium residues can be located in the vessel structure before the creation of the second reference image however. This can lead to undesired artifacts or disruptive influences in the second reference image and accordingly in the device image, which can be suppressed or removed by the at least one filter algorithm, in particular the bilateral filter algorithm.

The second reference image in particular represents the vessel structure and the environment, as explained with regard to the first reference image. The image recording or imaging parameters for the creation of the second reference image in this case can principally differ from those for the creation of the first reference image. The examination image for its part is recorded with identical imaging parameters to the second reference image to guarantee a maximum comparability and to avoid artifacts. The examination image likewise represents the vessel structure as well as the environment and in addition the device arranged in the object. What is achieved by the subtraction is that the device image in particular maps the device and the vessel structure and does not map the environment or maps it indistinctly.

Since for creation of the device image and of the vessel image in such embodiments, a subtraction is carried out in each case or a respective subtraction image is created, the process can also be referred to as a double subtraction method.

The examination image, as well as the second reference image, are in particular likewise respective x-ray images.

In accordance with at least one embodiment the at least one filter algorithm includes a local contrast enhancement algorithm.

In accordance with at least one embodiment the at least one filter algorithm includes a bilateral filter algorithm, which is characterized in particular by a spatial filter kernel and an intensity filter kernel.

The at least one filter algorithm can for example consist of the contrast enhancement algorithm or can consist of the bilateral filter algorithm or can include both the contrast enhancement algorithm and also the bilateral filter algorithm.

The device image and the vessel image each include a multitude of image points or pixels, which are assigned to corresponding detectors of a detector array of the sensor. In the case of digital x-ray imaging, the sensor includes an array, in particular a two-dimensional array, of photodiodes, which detect x-ray quanta emitted by the x-ray source and penetrating the object at least in part and can create corresponding detector signals. Accordingly, each pixel can be assigned a signal intensity, wherein the signal intensity can be encoded for visual representation for example as a gray value or another brightness value, also as an intensity value. Each pixel therefore has a corresponding intensity value.

The local contrast enhancement algorithm, just like the bilateral filter algorithm, can be understood as local digital filter algorithms. The filter algorithms thus in particular carry out a pixel-by-pixel or regional processing of the corresponding input information or input images.

The local contrast enhancement algorithm is embodied in particular as an asymmetric contrast enhancement algorithm. In other words, the contrast enhancement algorithm acts asymmetrically with regard to a local intensity threshold value. In other words, intensity values above the local intensity threshold value are not influenced by the contrast enhancement algorithm either in the identical way or in an inverted way as intensity values below the local intensity threshold value are.

In accordance with at least one embodiment, by application of the contrast enhancement algorithm, intensity values below a local intensity threshold value are made smaller and/or intensity values above the local intensity threshold value are made larger. The contrast enhancement algorithm in this case acts asymmetrically with regard to the local intensity threshold value.

For example, the intensity values below the local intensity threshold value can be made smaller and the intensity values above the local intensity threshold value can neither be made smaller nor made larger or essentially neither be made smaller nor made larger. As an alternative, the intensity values above the local intensity threshold value can be made larger by a degree of enlargement, wherein the enlargement of an intensity value above the local intensity threshold value is less greatly marked than the diminution of an intensity value at the same distance away from the intensity threshold value below the local intensity threshold value; the enlargement thus takes place by a degree of enlargement smaller compared to the degree of diminution. This leads to the asymmetric action of the contrast enhancement algorithm.

The consequence of this in particular is that devices that consist of a more x-ray-proof material are emphasized more heavily than the environment of the respective pixel, in particular the tissue of the object.

In the case of devices less x-ray proof compared to the surrounding tissue, the asymmetrical effect of the contrast enhancement algorithm can be conversely marked. Then for example substances like solid $CO_2$, also known as dry ice, can be emphasized, which in the wider sense could likewise be referred to as devices.

In accordance with at least one embodiment, an unsharpened input image is created by the processing unit for application of the contrast enhancement algorithm based on an input image dependent on the device image. By subtraction of the unsharpened input image from the input image, a contrast image is created, and by overlaying of the input image with the contrast image or with an image dependent on the contrast image, an enhanced-contrast image is created.

The enhanced-contrast image can then for example be seen as the result of the contrast enhancement algorithm.

The input image dependent on the device image can for example involve the device image or a pre-processed variant of the device image. It can also involve a result of the bilateral filter algorithm.

For unsharpening, which can also be referred to as blurring, a lowpass filter, a local Gaussian filter, a box kernel filter or a multiscalar filter can be used for example. Since the unsharpened input image corresponds to a variant of the input image with reduced contrast, the subtraction of the unsharpened input image from the input image produces the contrast image, in which those portions of the input image that to a certain extent give rise to its contrast, have been extracted. In other words, those parts of the input image that are not present in the unsharpened input image correspond to the contrast image.

The enhanced-contrast image can be created for example as the sum of the input image and the contrast image or as the sum of the input image and the image dependent on the contrast image. Through this, the contrasts of the input image are in any event partly enhanced. Ultimately this leads to a better recognizability of the device in the filtered device image and accordingly in the overlaying image. In accordance with at least one embodiment, the contrast image is modified locally asymmetrically by the processing unit as regards a local intensity threshold value and the enhanced-contrast image is then created by overlaying of the input image with the modified contrast image.

The characterization of the modification as asymmetric can in this case be understood in particular in such a way that the modification as regards the intensity threshold value is neither done symmetrically nor antisymmetrically.

The local intensity threshold value can differ for example for different pixels of the input image or input image pixel regions. In particular, the local intensity threshold value can be determined by the processing unit as the average intensity value of a predetermined environment of a pixel of the input image. Then for example, for application of the contrast enhancement algorithm, all pixels of the input image are considered, a respective intensity threshold value computed as the corresponding average intensity value and used as a foundation for the asymmetric modification of the contrast image.

In accordance with at least one embodiment, by the processing unit for modification of the contrast image, an intensity value of a pixel of the contrast image is made smaller if the intensity value of the pixel of the contrast image is less than the intensity threshold value. As an alternative or in addition, for modification of the contrast image by the processing unit, the intensity value of the pixel of the contrast image can be made larger if the intensity value of the pixel of the contrast image is greater than the intensity threshold value.

In both cases however, the value is made smaller and/or larger asymmetrically with regard to the intensity threshold value. In particular, the described reduction in size or enlargement of the intensity value of the pixel can be carried out for all pixels of the contrast image in order to create the modified contrast image.

An increased intensity value in this case corresponds to a brightening of the corresponding pixel and a reduction of the intensity value to a darkening of the pixel. By the pixels with intensity values that are less than the intensity threshold value being made smaller, rather dark portions of the contrast image tend to be further darkened. In such embodiments, brighter portions of the contrast image are not further brightened or are less heavily brightened than the dark portions are darkened. What is thus achieved in this way is that more x-ray-proof devices stand out more in the modified contrast image and accordingly also stand out more in the enhanced-contrast image.

If, by comparison with surrounding tissue, fewer x-ray-proof tools or the like are used, then the modification of the contrast image can include the brightening of the brighter regions of the contrast image and no darkening of the darker regions or a less heavy intense darkening.

What is achieved overall by the asymmetric characteristic of the contrast enhancement algorithm is that only those elements of the device image are intensified that are of particular interest, namely in particular the device.

In accordance with at least one embodiment, by application of the bilateral filter algorithm to an input image dependent on the device image, a filtered input image in accordance with a specification in the form $$i \cdot D_i = d_i - W_i^* \Sigma_j [d_j^* f(d_j)^* g(\delta_j)] \qquad (1)$$

is created. In this equation, $d_i$ represents an intensity value of a pixel i of the input image, and $D_i$ represents an intensity value of a corresponding pixel i of the filtered input image. $\Sigma_j$ designates a sum of all pixels j of the input image within a predetermined environment of the pixel I, and $d_j$ designates an intensity value of the respective pixel j of the input image. f designates the intensity filter kernel, and $\delta_j$ designates a spatial distance of the respective pixel j from the pixel i. g designates the spatial filter kernel, and $W_i$ designates a normalization factor. The intensity values can thus in particular be interpreted as functions of the location and where necessary of the time, wherein the equation (1) applies for a constant time.

In accordance with equation (1), a term is thus subtracted from the intensity values of the input image that corresponds to a double or bilateral filtering and has the structure of a double convolution, wherein the first convolution in accordance with the intensity filter kernel switches to the intensity values, while the second filtering in accordance with the spatial filter kernel realizes a spatial delimitation. What can be achieved by a filtering of this structure is that regions in a specific intensity or brightness range and with a specific spatial extent are suppressed or weakened in the input image or the device image. This can be used in particular so that artifacts of contrast medium residues, which are characterized for example by especially bright regions or, depending on contrast medium, by especially dark contiguous regions, can be taken into account.

In accordance with at least one embodiment, the spatial filter kernel is embodied as a Gaussian spatial filter kernel, thus in particular the following relationship applies:

$$i \cdot g(\delta_j) \sim \exp[-\delta_j^2 / S_R^2], \qquad (2)$$

wherein ~ expresses the direct proportionality of the two sides. In this case, $S_R$ designates a predetermined spatial reach of the spatial filter kernel.

In accordance with at least one embodiment, the intensity filter kernel is embodied as a Gaussian intensity filter kernel, so that in particular the following relationship applies:

$$i \cdot f(d_j) \sim \exp[-(d_j - S_0)^2 / S_I^2]. \qquad (3)$$

In this case, $S_I$ designates a predetermined reach of the intensity filter kernel, and $S_0$ designates a predetermined intensity reference value. The intensity reference value in this case is in particular greater than an average intensity value of the pixels of the environment of the pixel i, so that equation (1) tends to weaken or suppress brighter spatial regions in the input image. As an alternative, depending on the contrast medium used, the intensity reference value can be less than the average intensity value, so that dark regions are suppressed by equation (1).

It is pointed out however that neither the spatial filter kernel nor the intensity filter kernel necessarily have a Gaussian structure. In particular for example, functions with an approximately rectangular waveform or the waveform of a rectangle with rounded corners or a step function or the like can also be used for the intensity filter. Advantageously, the waveform is able to be differentiated.

For example, a Heaviside function H also comes into question, so that $$i \cdot f(d_j) \sim H(d_j - S_0), \qquad (4)$$

wherein $H(x)=1$ if $x \geq 0$ and $H(x)=0$ if $x<0$. Also, a corresponding differentiatable approximation, for example a Fermi function comes into question, so that $$ii \cdot f(d_j) \sim 1/[1 - \exp(-[d_j - S_0]/\Delta)], \qquad (5)$$

wherein $\Delta$ specifies a predetermined width of the function.

The input image dependent on the device image for the bilateral filter algorithm can correspond to the device image or processed version of the device image, for example a result of the contrast filter algorithm.

In particular, the different embodiments that specify the contrast filter algorithm can be combined with the different embodiments that specify the bilateral filter algorithm.

In accordance with at least one embodiment, a check in respect of contrast medium residues is carried out by the processing unit based on the device image. The bilateral filter algorithm is applied by the processing unit depending on a result of the check.

In other words, the at least one filter algorithm contains the bilateral filter algorithm depending on the result of the check only when for example, as a result of the check, the presence of contrast medium residues is established.

In accordance with the improved concept, an imaging apparatus (e.g., scanner or system) is also specified, which contains an imaging modality. The imaging apparatus, in particular the imaging modality, moreover includes a processing unit. The imaging modality is configured to create at least one sensor dataset, which relates to a vessel structure of an object to be imaged and to create at least one further sensor dataset, which relates to a device arranged in the object, in particular in the vessel structure. The processing unit is configured, based on the at least one sensor dataset, to create a vessel image, which maps the vessel structure, based on the at least one further sensor dataset to create a device image, which maps the device arranged in the object and, depending on the device image and the vessel image, to create an overlaying image. The processing unit is configured, by applying at least one filter algorithm to the device image, to create a filtered device image and to create the overlaying image by overlaying of the vessel image with the filtered device image.

In particular, the at least one sensor dataset can include the contrast medium image or the processing unit can be configured, based on the at least one sensor dataset, to create the contrast medium image. Accordingly, the at least one further sensor dataset can include the examination image or the processing unit can be configured, based on the at least one further sensor dataset, to create the examination image.

For example, the at least one sensor dataset can include the first reference image or the processing unit can be configured to create the at least one reference image based on the at least one sensor dataset. Accordingly, the at least one further sensor dataset can include the second reference image or the processing unit can be configured, based on the at least one further sensor dataset, to create the second reference image.

The imaging modality is in particular embodied as an x-ray imaging modality, for example as a digital x-ray imaging device. The imaging modality thus in particular includes an x-ray source and also a sensor unit. The sensor unit can for example include a detector array, in particular a two-dimensional detector array, of optical detectors, in particular photodiodes, which can create the at least one sensor dataset and the at least one further sensor dataset.

Further embodiments of the imaging apparatus according to the improved concept follow on from the various embodiments of the imaging method according to the improved concept and vice versa. In particular, the imaging apparatus according to the improved concept can be configured to carry out a method according to the improved concept or it carries out such an imaging method.

In accordance with the improved concept, a computer program product with commands is also specified. When the commands are executed by an imaging apparatus according to the improved concept, in particular by the processing unit of the imaging apparatus, the commands cause the imaging apparatus to carry out an imaging method in accordance with the improved concept.

The computer program product can be embodied in this case as a computer program with commands. The computer program product can also be embodied as a non-transitory computer-readable storage medium, which stores a computer program with the commands.

The features and combinations of features given here in the description as well as the features and combinations of features given below in the description of the figures and/or in the figures alone are able to be used not only in the respective specified combination, but also in other combinations, without departing from the framework of the invention. Embodiments and combinations of features are also to be seen as disclosed that do not have all features of an originally formulated independent claim and/or that go beyond the combinations of features presented in the references of the claims or that deviate from said combinations.

DETAILED DESCRIPTION OF THE PREFERRED EMBODIMENTS

Figure 1:
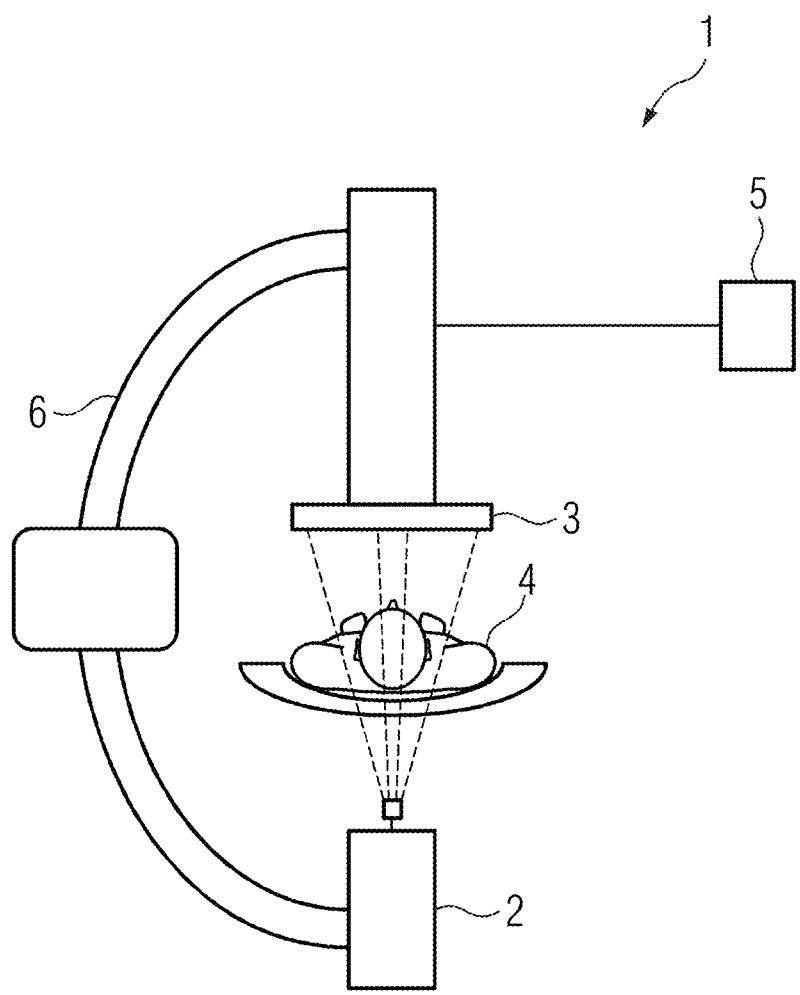
FIG. 1 shows a schematic diagram of an example of an embodiment of an imaging apparatus according to the improved concept.

Shown schematically in FIG. 1 is an example of an embodiment of an imaging apparatus 1 according to the improved concept, which is embodied as an x-ray imaging apparatus for example. Shown in the example depicted in FIG. 1 is a construction of the x-ray imaging apparatus according to the principle of a C-arm device with a rotatable and movable C-arm 6, which can be turned and driven accordingly, in order to image an object 4 to be imaged from different directions. An imaging apparatus 1 according to the improved concept can however also be constructed in other ways. In particular, the improved concept is not basically restricted to x-ray-based imaging methods.

The imaging apparatus 1 of FIG. 1 thus includes an x-ray source 2 for example, which is configured to create x-ray radiation and to emit it in the direction of the object 4. Arranged on a side of the object 4 lying opposite the x-ray source 2 is a sensor 3 of the imaging apparatus 1, which for example contains a detector array of photodiodes, in order to be able to detect x-ray quanta penetrating through the object 4. The sensor 3 can then for example transfer corresponding detector signals to a processing unit 5 of the imaging apparatus 1 for further processing.

The imaging apparatus 1 can be configured for example for carrying out a roadmap method, in particular a roadmap method based on the principle of double subtraction.

The functioning of the imaging apparatus 1 will be explained in greater detail below with regard to different embodiments of an imaging method according to the improved concept, in particular with reference to FIGS. 2 to 7.

As an alternative or in addition, the imaging apparatus 1 can be configured for carrying out a rotation angiography method. In this case, the processing unit 5 can for example create a multitude of two-dimensional projections recorded from different angles and the processing unit 5 or a further processing unit (not shown) can compute a three-dimensional reconstruction from them.

Figure 2:
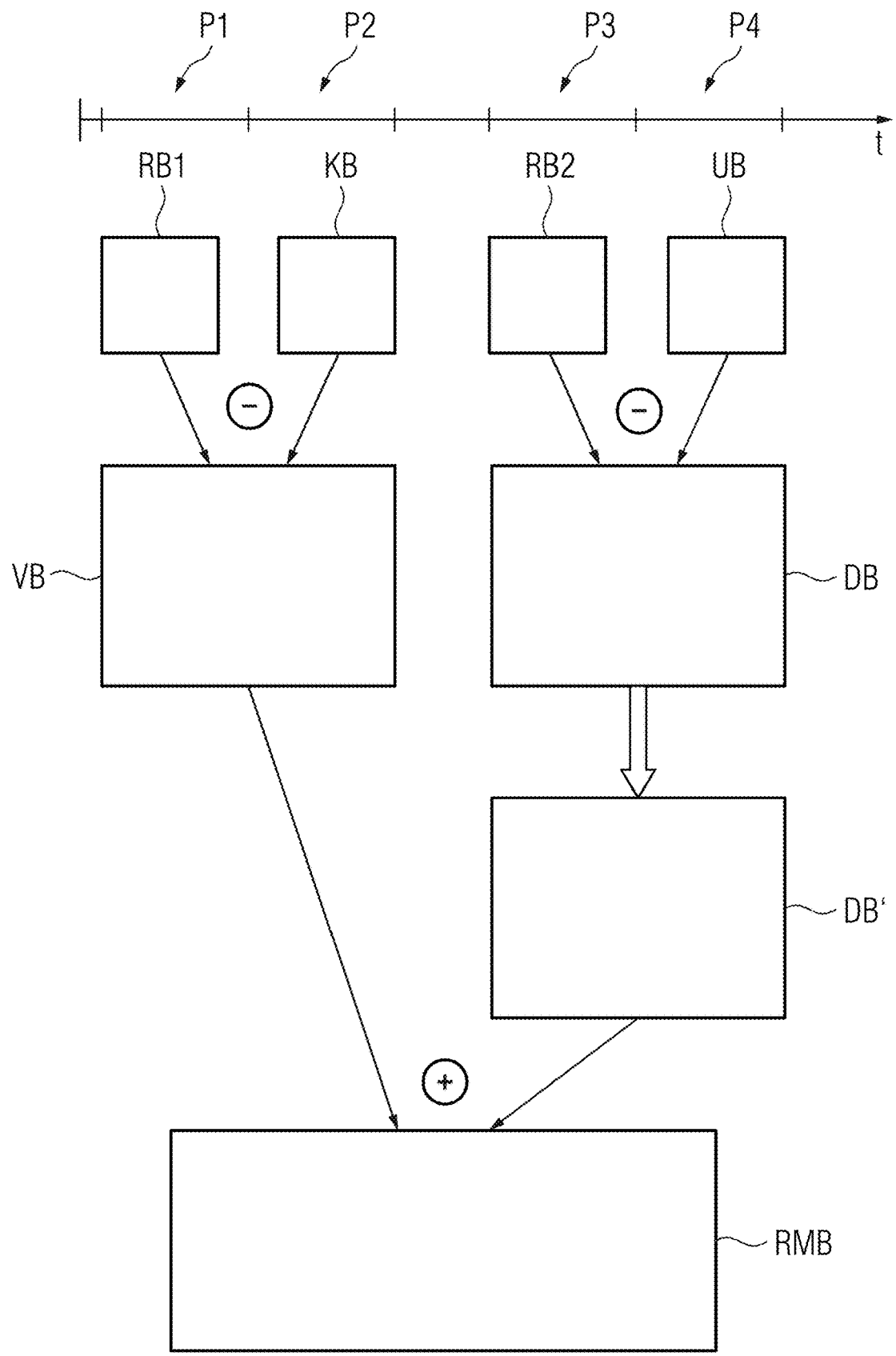
FIG. 2 shows a schematic flow diagram of an example of an embodiment of an imaging method according to the improved concept.

Shown in FIG. 2 is an example of an embodiment of an imaging method according to the improved concept, which is embodied as a roadmap method according to the principle of double subtraction.

To this end, a timeline, which schematically represents different recording phases P1, P2, P3, P4 as a function of the time t, is shown in an upper area of FIG. 2.

In a first phase P1, a first reference image RB1 of a region of the object 4 is created, which shows a vessel structure 7 (see FIG. 5 and FIG. 7) and a corresponding tissue environment of the vessel structure 7. The first reference image RB1 can also be designated as the first mask or acquisition mask. In a second phase P2 following the first Phase P1, in particular immediately following it, a contrast medium image KB of the same region of the object 4 is recorded, that accordingly likewise shows the vessel structure 7 and the environment. For creation of the first reference image RB1 however no contrast medium is used. A contrast medium is introduced into the vessel structure for example in the course of the second phase P2, so that the contrast medium image KB maps the vessel structure 7 in a highlighted way. Depending on the contrast medium used and depending on the processing of the resulting images, the vessel structure 7 can be shown brighter or darker than the surrounding tissue. The administration of the contrast medium in this case is not to be seen as a part of the method according to the improved concept, however.

Figure 6:
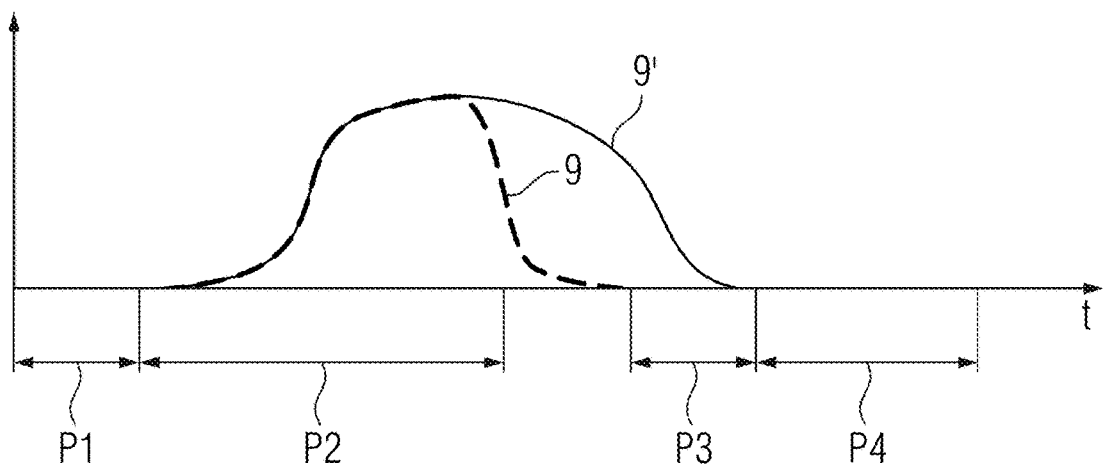
FIG. 6 shows a schematic timing waveform of a contrast medium concentration in accordance with further examples of embodiments of an imaging method according to the improved concept.

Shown again in FIG. 6 is the timeline with the phases P1, P2, P3, P4, wherein a contrast medium concentration 9 in the vessel structure 7 as a function of the time is shown schematically on the ordinate. After the second phase, in a third phase P3, a second reference image RB2 is recorded, as shown once again in FIG. 2. In this case, the third phase P3 as a rule does not follow on immediately from the second phase P2, so that, as indicated in FIG. 6, the contrast medium concentration 9 has already almost dropped to zero at the beginning of the third phase P3. It can occur however that during the third phase P3 significant residues of contrast medium are still present in the vessel structure 7, as shown schematically by the alternate contrast medium concentration 9' as a function of the time t. Such contrast medium residues can have various causes. For example, anatomical or pathological reasons can be present in the object 4. It can also occur that the third phase P3, initiated manually by a user for example, was incorrectly initiated too early, so that the creation of the second reference image RB2 is already started before the contrast medium concentration 9' has dropped to zero.

After the third phase P3, in a fourth phase P4, an examination image UB is created, which maps a device 8 (see FIG. 5 and FIG. 7) that was introduced into the object 4 after the creation of the second reference image RB2, in particular into the vessel structure 7. The introduction of the device 8 into the object 4 or the movement of the administration of the contrast medium in this case however is not to be seen as part of the method according to the improved concept. The examination image UB therefore shows both the vessel structure 7 and where necessary the environment as well as the device 8. Likewise, no contrast medium is used for creation of the examination image UB.

The device 8 as a rule involves an object that has a greater resistance to x-rays than the surrounding tissue. Depending on the processing of the output images, the device 8 can therefore in particular be shown darker than the surrounding tissue. The device 8 can in particular include a metal, for example platinum, stainless steel or gold. The device 8 can fulfill different functions. For example, the device 8 can be part of a vessel catheter, a guide wire, or a part thereof, a part of a vessel prosthesis or of a stent, a marker and so forth. The device 8 can however also contain a less x-ray-proof material by comparison with the environment, such as for example $CO_2$, in particular dry ice.

The processing unit 5 combines the first reference image RB1 with the contrast medium image KB in order to obtain a vessel image VB. The combination of the first reference image RB1 with the contrast medium image KB can for example include a registration of the contrast medium image KB with the first reference image RB1. Above and beyond this, the combination includes a subtraction of the first reference image RB1 from the contrast medium image KB or vice versa or the corresponding registered images. In addition, the combination can include a further processing of the subtracted images. In other words, the vessel image VB can be expressed as VB=VP(KB−RB1), wherein VP represents any given vessel processing function.

Similarly, the processing unit 5 can combine the second reference image RB2 with the examination image UB in order to create a device image DB. In this case, the second reference image RB2 is in particular subtracted from the examination image UB or vice versa or correspondingly registered images are subtracted from one another. Moreover, the result of the subtraction can likewise be processed. Accordingly, the device image DB can be expressed as DB=DP(UB−RB2), wherein DP designates any given device processing function.

Figure 7:
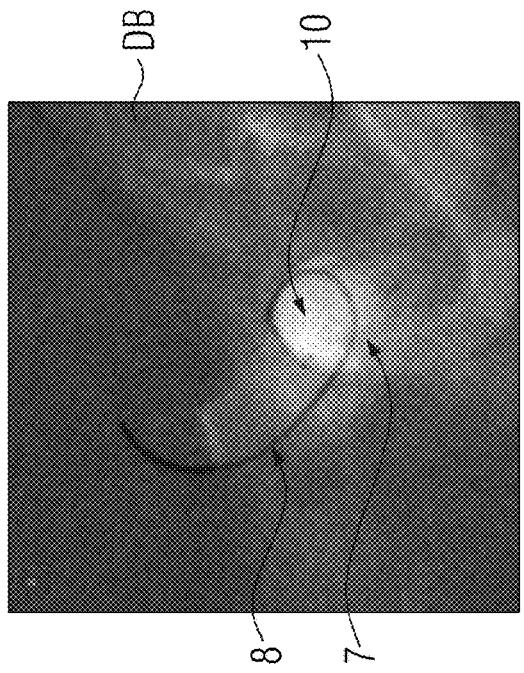
FIG. 7 shows a filtered device image and an overlaying image in accordance with a further example of an embodiment of an imaging method according to the improved concept and also a further overlaying image.
Figure 7:
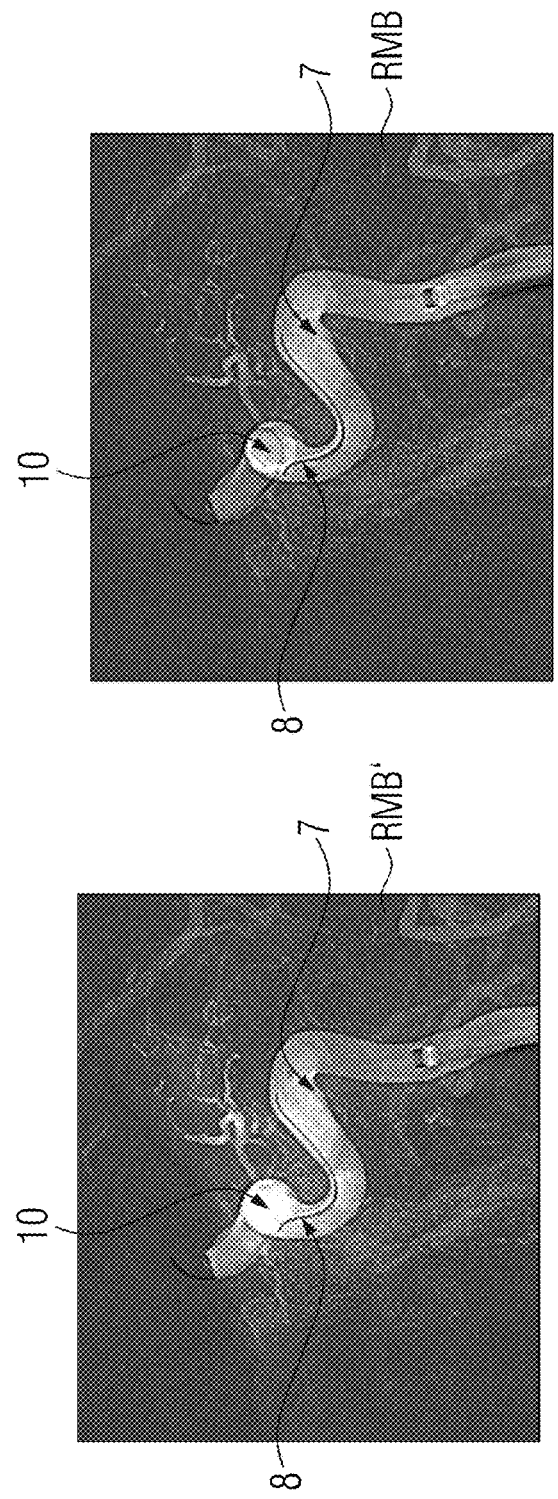

Usually, the contrast medium is selected in the second phase P2 and the images are also processed in such a way that the device image DB shows the device 8 darker than the device environment and in particular darker than the vessel structure 7 (see for example upper image in FIG. 7). This is however not necessarily the case.

The processing unit 5 applies at least one filter algorithm to the device image DB in order to obtain as a result a filtered device image DB'. The processing unit 5 then overlays the filtered device image DB' with the vessel image VB in order to obtain an overlaying image RMB, which can also be designated as a roadmap image. The overlaying image RMB can thus also be expressed as RMB=MIX(VB,DB'), wherein MIX represents an overlaying function, in the simplest case an addition.

The device image DB' in this case is given by a multitude of pixels, which each correspond to an intensity value. The spatial position of each pixel can be specified by corresponding two-dimensional spatial coordinates. This also applies in a similar way to vessel image VB. While the reference images RB1, RB2 and the contrast medium image KB can be static images, i.e., in particular not be updated over the course of time, the examination image UB is generally updated during consecutive frames, which correspond to repetitions of the fourth phase P4. Accordingly, the examination image UB is also occasionally referred to as a live image. As a consequence, the filtered device image DB' as intensity value can be understood as a function of the two-dimensional spatial coordinates and the time, while the vessel image VB as intensity value can be understood as a function of the two-dimensional spatial coordinates, but not of the time.

The at least one filter algorithm can for example include an asymmetric contrast enhancement algorithm. The way in which the asymmetric contrast enhancement algorithm functions is shown by way of example in FIGS. 3 to 5.

Figure 3:
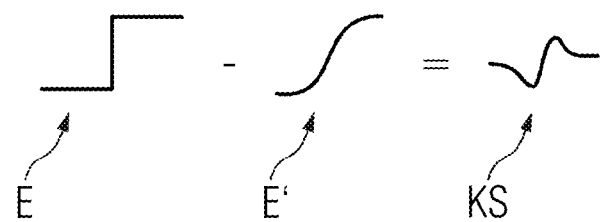
FIG. 3 shows a schematic diagram of the processing of intensity values in accordance with a further exemplary embodiment of an imaging method according to the improved concept.

Shown in FIG. 3 is the creation of a contrast image based on an input image. The input image in this case can correspond to the device image DB or to an image dependent thereon. Shown in FIG. 3 is an input signal E, which as a schematic spatial waveform corresponds to the intensity values in a region of the input image. The input signal E has a more or less steep step, which corresponds to the transition from a less x-ray-proof material to a more x-ray-proof material, for example a transition from tissue to the device 8. The processing unit 5 creates a spatially unsharpened signal E', which can also be designated as a blurred signal, for example by convolution of the input signal E or of the entire input image with a Gaussian filter or a box kernel filter. As an alternative a multiscalar filter approach can also be used.

The unsharpened input signal E' is then for example subtracted from the input signal E by the processing unit 5 in order to create a contrast signal KS. As an alternative, the process can be understood in such a way that an unsharpened input image is subtracted from the input image in order to create a contrast image.

Figure 4:
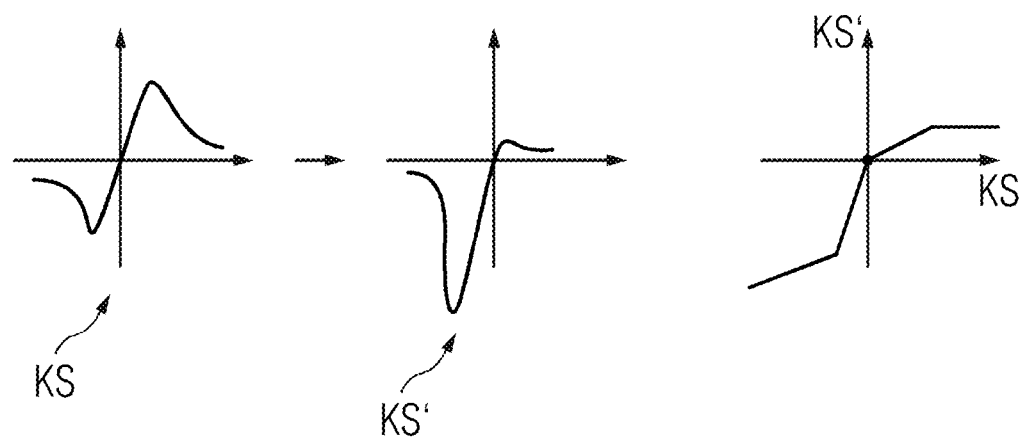
FIG. 4 shows a schematic diagram of the processing of intensity values in accordance with a further exemplary embodiment of an imaging method according to the improved concept.

The contrast signal KS or the contrast image is now modified asymmetrically by the processing unit, as is shown in FIG. 4. As a result, a modified contrast signal KS' or a corresponding modified contrast image is obtained.

Since typically more x-ray-proof materials are used as devices in x-ray imagings, for example guide wires, stents, platinum markers, iodine and so forth, these are contained in the input image with a negative or dark contrast by comparison with the environment. The contrast signal KS can thus be processed by the modification in such a way that positive, i.e., bright values are weakened in the contrast signal KS and negative, i.e., dark, values in the contrast signal KS are intensified. This can be achieved for example by a parameterizable look-up table or another predetermined function, as is depicted for example to the far right in FIG. 4.

The modified contrast signal KS' is then overlaid with the input image E, for example the two are summed. Accordingly, in the input image dark portions are locally intensified by the application of the asymmetric contrast enhancement algorithm, i.e., their brightness is further reduced, while bright portions are not locally intensified or are intensified less than the dark parts.

In alternative embodiments, the brighter values can also be amplified in the contrast signal KS and the darker values suppressed. This can be advantageous in order to delimit less dense materials, such as for example $CO_2$, more strongly from the environment.

Figure 5:
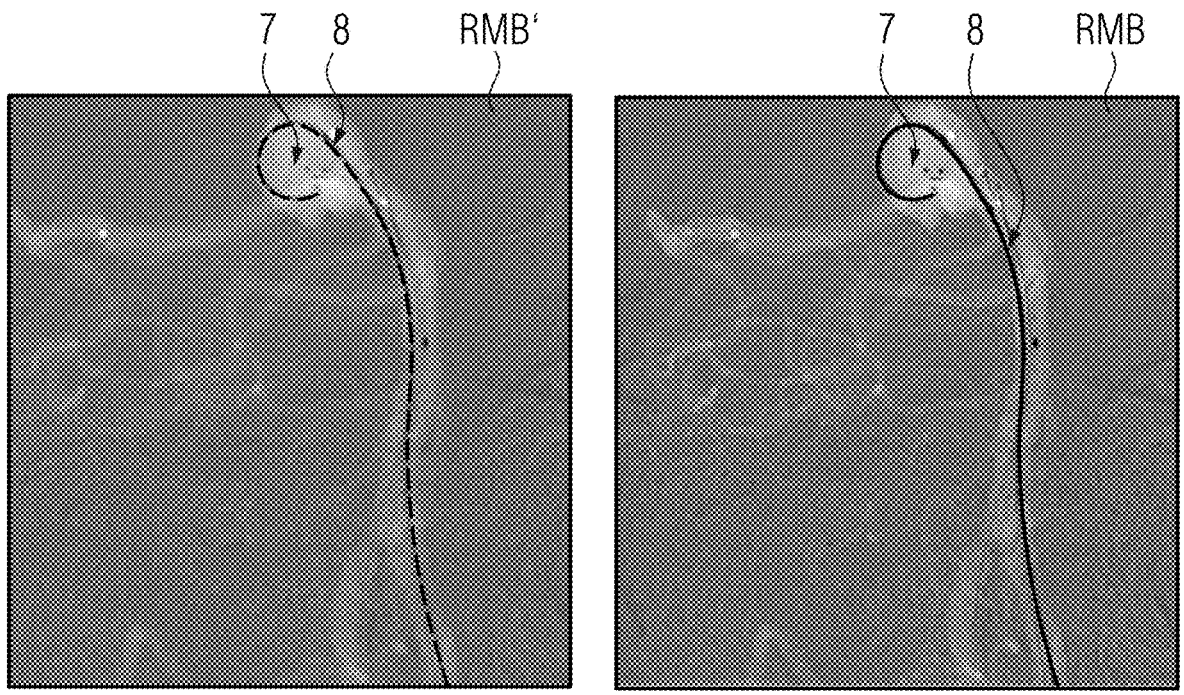
FIG. 5 shows a schematic diagram of an overlaying image and also a further overlaying image created in accordance with a further example of an embodiment of an imaging method according to the improved concept.

In FIG. 5, an example of a resulting overlaying image RMB is shown on the right in FIG. 5. Shown on the left in FIG. 5 is a further overlaying image RMB', in which the asymmetric contrast enhancement algorithm has not been applied. By comparison, the tool 8 in the overlaying image RMB, in which the local asymmetric contrast enhancement algorithm was used, can be seen more clearly. This is indicated by the fact that the tool 8 on the right in FIG. 5 is depicted as a solid line and on the left in FIG. 5 as a dashed line.

The particular effect of the asymmetric local contrast enhancement algorithm, in particular by comparison with conventional local or global contrast enhancement algorithms, lies in its fundamental effect on human perception. The human perception of adjacent image regions of different brightness is deceived by the asymmetric increase of the contrast in such a way that the average difference in brightness on the side of the image region border on which the contrast is asymmetrically increased appears greater than it actually is. In other words, the darker region appears to be darkened even more, and this not only at the border but over an entire image region. This effect is utilized to highlight relevant regions in the filtered images even more strongly.

Optionally, the more evident highlighting of the device 8 can be intensified even further if the modified contrast signal KS' in different embodiments is weighted with a measure of the local gradient strength. The local gradient strength can be computed in this case for example via a Sobel operator.

As an alternative or in addition to the asymmetric contrast enhancement algorithm, the at least one filter algorithm can include a bilateral filter algorithm. The effect of the bilateral filter algorithm is shown by way of example in FIG. 7.

The use of the bilateral filter algorithm can be advantageous in particular, when, as explained with regard to FIG. 6, the contrast medium concentration 9' at the start of the third phase P3 has not yet dropped completely, so that artifacts or influences of the contrast medium are also undesirably present in the second reference image RB2. This leads for example to bright areas being present in the device image DB, which influence the recognizability of the vessel structure 7 and/or of the device 8 or the position of specific parts of the device 8 in the vessel structure 7. This can be seen for example in the upper image in FIG. 7, in which a contrast medium residue 10 is visible as a bright speck. Optionally the contrast medium residues can be automatically detected in the device image DB in order to trigger the bilateral filter algorithm, thus, to cause it to be used. The bilateral filter algorithm in this case is comparable to a DDO filter embodied with a specific sensitivity for larger white regions. This can be achieved for example by a filtering in the form given by equation (1) and for example equations (2) to (5).

The intensity filter kernel f can also be understood in this case as a weighting function of the signal difference. The weighting factor $W_i$ can be used for example to ensure a rescaling of the sum to a constant value, for example 1.

This enables the adverse effect on image quality caused by the contrast medium residues to be completely or partly compensated for automatically. Shown on the right at the bottom in FIG. 7 is a corresponding resulting overlaying image RMB. Shown on the left at the bottom in FIG. 7 is a further overlaying image RMB', for the creation of which the bilateral filter algorithm has not been applied. As can be seen by comparison, the disruption 10 by the contrast medium residue in overlaying image RMB, for which the bilateral filter has been used, is diminished.

With regard to the figures, it has been described in particular how, inter alia, the asymmetric contrast enhancement algorithm can be used gainfully in the context of roadmap methods. The application of such an asymmetric contrast enhancement algorithm is however where necessary also advantageous in other imaging methods. For example, in particular in the use of C-arm devices, the option exists of recording rotation angiographies. Here an object is recorded from different angles with 2D projections and from these a 3D reconstruction is computed. The 2D data before the 3D reconstruction can be displayed as additional information. As well as the 3D reconstruction, a user can in addition or as an alternative orient themself to displaying the 2D projections. In particular, the display of devices, but also the display of vessel structures and the relationship of the device to the vessel structure, is very easily possible on the basis of the 2D projections.

To improve the display of the 2D projections, the asymmetric contrast enhancement filter described above can therefore be applied to the 2D projections and a corresponding result displayed. The 3D reconstruction in this case is in particular not influenced by the contrast enhancement filter, since for this the raw data from the two-dimensional recordings is required.

The different forms of application of the imaging method according to the improved concept can accordingly be transferred to an imaging method for rotation angiography.

It is intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. An imaging method comprising:
   creating a vessel image, which maps a vessel structure of an object to be imaged, and also a device image, which maps a device arranged in the object, by an imaging apparatus; and
   applying, by a processor, at least one filter algorithm to the device image, resulting in a filtered device image, wherein the at least one filter algorithm includes a local contrast enhancement, wherein the local contrast enhancement comprises creating, by the processor in the applying: an unsharpened input image based on an input image dependent on the device image, a contrast image created by subtraction of the unsharpened input image from the input image, and an enhanced-contrast image created by overlaying of the input image with the contrast image or with an image dependent on the contrast image; and
   creating, by the processor, an overlaying image by overlaying of the vessel image with the filtered device image.

2. The imaging method as claimed in claim 1, characterized in that the processor modifies the contrast image locally asymmetrically with regard to a local intensity threshold value and creates the enhanced-contrast image by overlaying of the input image with the modified contrast image.

3. The imaging method as claimed in claim 2, characterized in that the local intensity threshold value is determined by the processor as the average intensity value of a predetermined environment of a pixel of the input signal.

4. The imaging method as claimed in claim 2, characterized in that,
   for modification of the contrast image, an intensity value of a pixel of the contrast image is made smaller by a measure of diminution, when the intensity value of the pixel of the contrast image is less than the intensity threshold value; and/or
   for modification of the contrast image, the intensity value of the pixel of the contrast image is not made larger or is made larger by a smaller measure of increase compared with the measure of reduction, when the intensity value of the pixel of the contrast image is greater than the intensity threshold value.

5. The imaging method as claimed in claim 1, characterized in that by application of the contrast enhancement, intensity values below a local intensity threshold value are made smaller and/or intensity values above the local intensity threshold value are made larger; wherein the contrast enhancement acts asymmetrically with regard to the local intensity threshold value.

6. The imaging method as claimed in claim 5, characterized in that the contrast enhancement makes intensity values below the local intensity threshold value smaller by a measure of diminution and does not make intensity values above the local intensity threshold value larger or makes the intensity values above the local intensity threshold value larger by a smaller measure of enlargement by comparison with the measure of diminution.

7. The imaging method as claimed in claim 1, characterized in that the at least one filter algorithm contains a bilateral filter algorithm characterized by a spatial filter kernel and an intensity filter kernel.

8. The imaging method as claimed in claim 7, characterized in that, by application of the bilateral filter algorithm to an input image dependent on the device image, a filtered input image according to a specification in the form $$D_i = d_i - W_i * \Sigma_j [d_j] * f(d_i) * g(\delta_j)]$$

is created, wherein $d_i$ designates an intensity value of a pixel i of the input image, $D_i$ an intensity value of a corresponding pixel i of the filtered input image, $\Sigma_j$ a sum of all pixels j of the input image within a predetermined environment of the pixel i, $d_j$ an intensity value of the respective pixel j, f the intensity filter kernel, $\delta_j$ a spatial distance of the respective pixel j from the pixel i, g the spatial filter kernel and $W_i$ a normalization factor.

9. The imaging method as claimed in claim 8, characterized in that:
   for the spatial filter kernel, the following relationship applies:

$$g(\delta_j) \sim \exp[-\delta_j^2/S_R^2],$$

wherein $S_R$ designates a predetermined reach of the spatial filter kernel; and/or
   for the intensity filter kernel, one of the following relationships applies:

$$f(d_j) \sim \exp[-(d_j-S_0)^2/S_I^2],$$

$$f(d_j) \sim H(d_j-S_0), \text{ or}$$

$$f(d_j) \sim 1/[1-\exp(-[d_j-S_0]/\Delta)],$$

wherein $S_I$ designates a predetermined reach of the intensity filter kernel, $S_0$ a predetermined intensity reference value, H the Heaviside function and $\Delta$ a predetermined width.

10. The imaging method as claimed in claim 7, characterized in that:
    based on the device image, a check in respect of contrast medium residues is carried out by the processor; and
    the bilateral filter algorithm is applied depending on the result of the check.

11. The imaging method as claimed in claim 1, characterized in that:
    without using a contrast medium, a first reference image is created by the imaging apparatus and, using a contrast medium, a contrast medium image is created, the contrast medium image representing the vessel structure; and
    the vessel image is created by the processor as a first subtraction image formed as the first reference image subtracted from the contrast medium image.

12. The imaging method as claimed in claim 11, characterized in that:
    after the creation of the contrast medium image, a second reference image is created by the imaging apparatus and an examination image is created, the examination image showing the device arranged in the object; and the device image is created by the processor as a second subtraction image formed as the second reference image subtracted from the examination image.

13. An imaging system comprising:

an imaging apparatus configured to create at least one sensor dataset, which relates to a vessel structure of an object to be imaged, and to create at least one further sensor dataset, which relates to a device arranged in the object; and a processor configured to create a vessel image based on the at least one sensor dataset, the vessel image representing the vessel structure, to create a device image based on the at least one further sensor dataset, the device image representing the device arranged in the object, to create a filtered device image by application of at least one filter algorithm to the device image, wherein the at least one filter algorithm includes a local contrast enhancement, where by application of the contrast enhancement, intensity values below a local intensity threshold value are made smaller and/or intensity values above the local intensity threshold value are made larger, and wherein the contrast enhancement acts asymmetrically with regard to the local intensity threshold value, and, to create an overlaying image by overlay of the vessel image with the filtered device image.

14. A non-transitory computer readable medium storing instructions that, when executed by an imaging apparatus, perform imaging, the instructions being for:

creation of a vessel image, which maps a vessel structure of an object to be imaged, and also a device image, which maps a device arranged in the object by an imaging apparatus;

application of at least one filter algorithm to the device image, resulting in a filtered device image, wherein the at least one filter algorithm contains a bilateral filter algorithm characterized by a spatial filter kernel and an intensity filter kernel; and creation of an overlaying image by overlaying of the vessel image with the filtered device image.

* * * * *